United States Patent
Chae et al.

(10) Patent No.: US 10,935,629 B2
(45) Date of Patent: Mar. 2, 2021

(54) METHOD FOR PERFORMING OTDOA-RELATED OPERATIONS IN WIRELESS COMMUNICATION SYSTEM

(71) Applicant: LG ELECTRONICS INC., Seoul (KR)

(72) Inventors: Hyukjin Chae, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 273 days.

(21) Appl. No.: 15/553,828

(22) PCT Filed: Feb. 29, 2016

(86) PCT No.: PCT/KR2016/002026
§ 371 (c)(1),
(2) Date: Aug. 25, 2017

(87) PCT Pub. No.: WO2016/137308
PCT Pub. Date: Sep. 1, 2016

(65) Prior Publication Data
US 2018/0024225 A1    Jan. 25, 2018

Related U.S. Application Data

(60) Provisional application No. 62/121,502, filed on Feb. 27, 2015, provisional application No. 62/144,918, filed on Apr. 8, 2015.

(51) Int. Cl.
*G01S 5/10* (2006.01)
*H04W 56/00* (2009.01)
(Continued)

(52) U.S. Cl.
CPC ........ *G01S 5/10* (2013.01); *G01S 5/02* (2013.01); *H04W 24/08* (2013.01); *H04W 56/00* (2013.01);
(Continued)

(58) Field of Classification Search
CPC ........ G01S 5/0236; G01S 5/0036; G01S 5/10; G01S 5/00; H04W 64/00; H04W 4/029
See application file for complete search history.

(56) References Cited

U.S. PATENT DOCUMENTS 8,903,415 B2 * 12/2014 Kazmi ................. H04W 64/00
                                                         455/443
9,084,216 B2 *  7/2015 Chin ...................... G01S 5/0252
(Continued)

FOREIGN PATENT DOCUMENTS

KR    10-2012-0008431 A    1/2012
KR    10-2012-0053941 A    5/2012
(Continued)

OTHER PUBLICATIONS

ETSI, "LTE; Evolved Universal Terrestrial Radio Access (E-UTRA); LTE Positioning Protocol (LPP) (3GPP TS 36.355 version 12.3.0 Release 12)," ETSI TS 136 355 V12.3.0, Feb. 2015, pp. 1-127 (128 pages total), XP055510285.
(Continued)

*Primary Examiner* — Nam T Huynh
(74) *Attorney, Agent, or Firm* — Birch, Stewart, Kolasch & Birch, LLP

(57) ABSTRACT

One embodiment of the present invention relates to a method by which a terminal performs observed time difference of arrival (OTDOA)-related operations in a wireless communication system, the method comprising the steps of: receiving a ProvideAssistanceData message from a server; receiving a RequestLocationInformation message from the
(Continued)

server; measuring a reference signal time difference (RSTD) on the basis of a reference cell after receiving the RequestLocationInformation message; and transmitting the RSTD measurement result to the server, wherein the reference cell is a reference cell indicated by information included in the ProvideAssistanceData or is selected by the terminal from among a plurality of cells indicated by the information included in the ProvideAssistanceData.

10 Claims, 9 Drawing Sheets

(51) Int. Cl.
*H04W 64/00* (2009.01)
*G01S 5/02* (2010.01)
*H04W 24/08* (2009.01)
*H04L 1/00* (2006.01)

(52) U.S. Cl.
CPC ........... *H04W 64/00* (2013.01); *G01S 5/0236* (2013.01); *H04L 1/004* (2013.01)

(56) References Cited

U.S. PATENT DOCUMENTS

| | | | |
|---|---|---|---|
| 9,651,653 B2* | 5/2017 | Fischer | H04W 64/006 |
| 2012/0040687 A1* | 2/2012 | Siomina | G01S 5/0205 |
| | | | 455/456.1 |
| 2012/0275329 A1* | 11/2012 | Chin | H04W 64/00 |
| | | | 370/252 |
| 2013/0260693 A1 | 10/2013 | Un et al. | |
| 2013/0285856 A1* | 10/2013 | Opshaug | G01S 5/14 |
| | | | 342/464 |

FOREIGN PATENT DOCUMENTS

| | | |
|---|---|---|
| KR | 10-2014-0089249 A | 7/2014 |
| KR | 10-2015-0016930 A | 2/2015 |

OTHER PUBLICATIONS

Fischer, "Observed Time Difference of Arrival (OTDOA) Positioning in 3GPP LTE," General OTDOA Positioning Procedures, Qualcomm Technologies, Inc., Jun. 6, 2014, pp. 1-62, XP055284784.

3GPP, "3rd Generation Partnership Project; Technical Specification Group Radio Access Network; Evolved Universal Terrestrial Radio Access (E-UTRA); LTE Positioning Protocol (LPP) (Release 9)," 3GPP TS 36.355, V9.2.1, Jun. 2010, pp. 1-112.

* cited by examiner

METHOD FOR PERFORMING OTDOA-RELATED OPERATIONS IN WIRELESS COMMUNICATION SYSTEM

CROSS REFERENCE TO RELATED APPLICATIONS

This application is the National Phase of PCT International Application No. PCT/KR2016/002026, filed on Feb. 29, 2016, which claims priority under 35 U.S.C. 119(e) to U.S. Provisional Application No. 62/121,502, filed on Feb. 27, 2015 and No. 62/144,918, filed on Apr. 8, 2015, all of which are hereby expressly incorporated by reference into the present application.

TECHNICAL FIELD

Following description relates to a wireless communication system, and more particularly, to a method for a terminal to perform OTDOA-related operations and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE OF THE INVENTION

Technical Task

A technical task of the present invention is to provide a method of performing OTDOA-related operations capable of improving accuracy of location estimation.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing an OTDOA (observed time difference of arrival)-related operation, which is performed by a terminal in a wireless communication system, includes the steps of receiving a ProvideAssistanceData message from a server, receiving a RequestLocationInformation message from the server, measuring an RSTD (Reference Signal Time Difference) on the basis of a reference cell after the RequestLocationInformation message is received, and transmitting a measurement result of the RSTD to the server. In this case, the terminal can select the reference cell from among a reference cell indicated by information included in the ProvideAssistanceData or a plurality of cells indicated by the information included in the ProvideAssistanceData.

To further achieve these and other advantages and in accordance with the purpose of the present invention, according to a different embodiment, a terminal performing an OTDOA (observed time difference of arrival)-related operation in a wireless communication system includes a transmitter and a receiver, and a processor, the processor configured to receive a ProvideAssistanceData message from a server, the processor configured to receive a RequestLocationInformation message from the server, the processor configured to measure an RSTD (Reference Signal Time Difference) on the basis of a reference cell after the RequestLocationInformation message is received, the processor configured to transmit a measurement result of the RSTD to the server. In this case, the terminal can select the reference cell from among a reference cell indicated by information included in the ProvideAssistanceData or a plurality of cells indicated by the information included in the ProvideAssistanceData.

The terminal can select a cell closest to the terminal as a reference cell from among a plurality of the reference cells.

The terminal can select a cell of a strongest signal as a reference cell from among a plurality of the reference cells.

The measurement result of the RSTD can be included in a ProvideLocationInformation message.

The ProvideLocationInformation message can mandatorily include quality information of the reference cell.

The quality information of the reference cell can include OTDOA-MeasQuality.

The OTDOA-MeasQuality can include the best estimation value of the terminal for the uncertainty of OTDOA measurement.

Advantageous Effects

According to the present invention, it is able to improve accuracy of OTDOA measurement.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
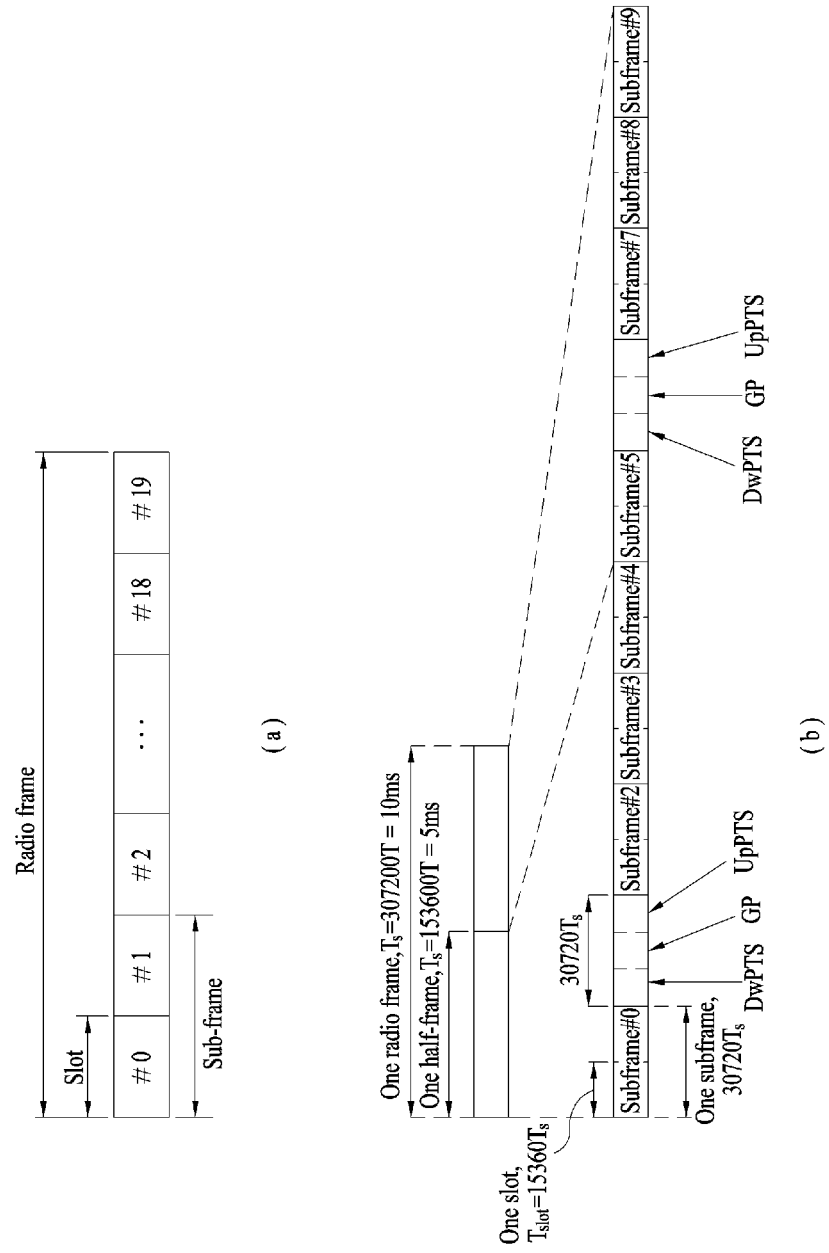
FIG. 1 is a diagram for a structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)". A base station can be used as a meaning indicating a scheduling node, a cluster head, and the like. If a base station or a relay transmits a signal transmitted by a terminal, the base station or the relay can be regarded as a terminal.

In the following, such a term as a cell is applied to such a transmission/reception point as a base station (eNB), a sector, a remote radio head (RRH), and the like. The cell can be used as a comprehensive term to identify a component carrier in a specific transmission/reception point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
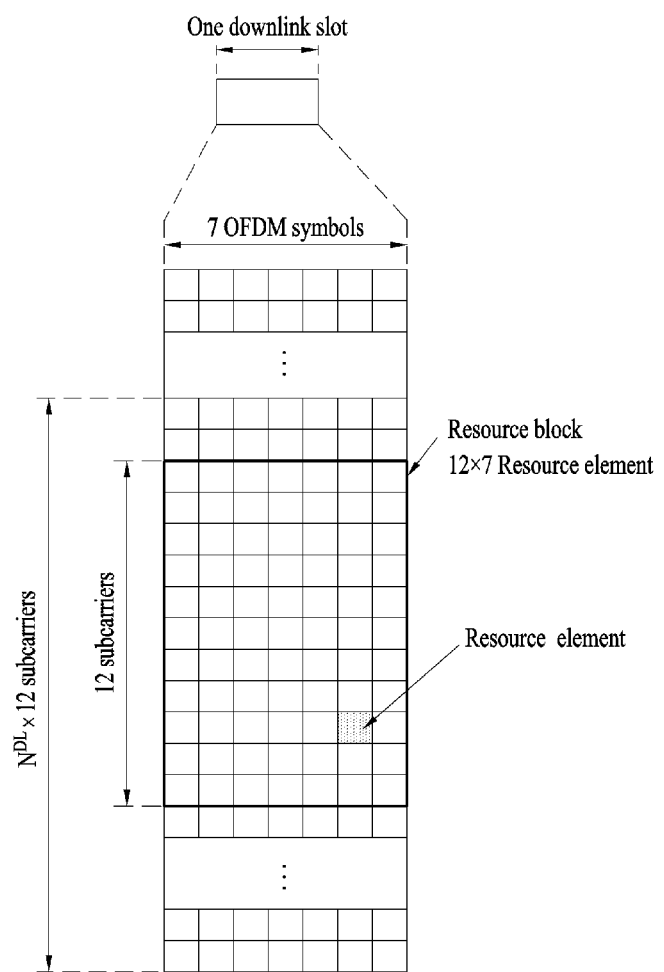
FIG. 2 is a diagram for a resource grid in a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
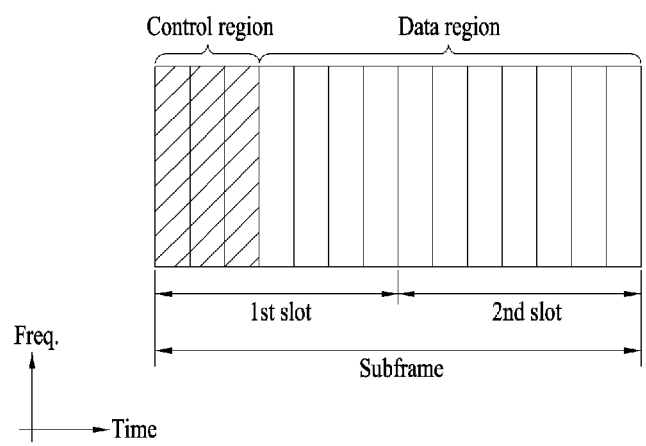
FIG. 3 is a diagram for a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
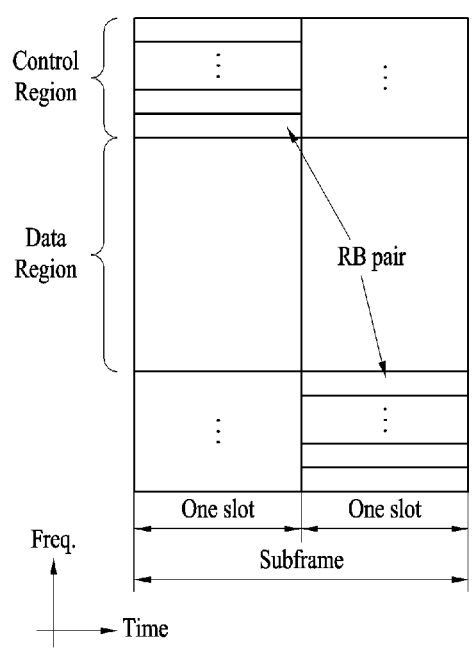
FIG. 4 is a diagram for a structure of an uplink subframe.
Figure 5:
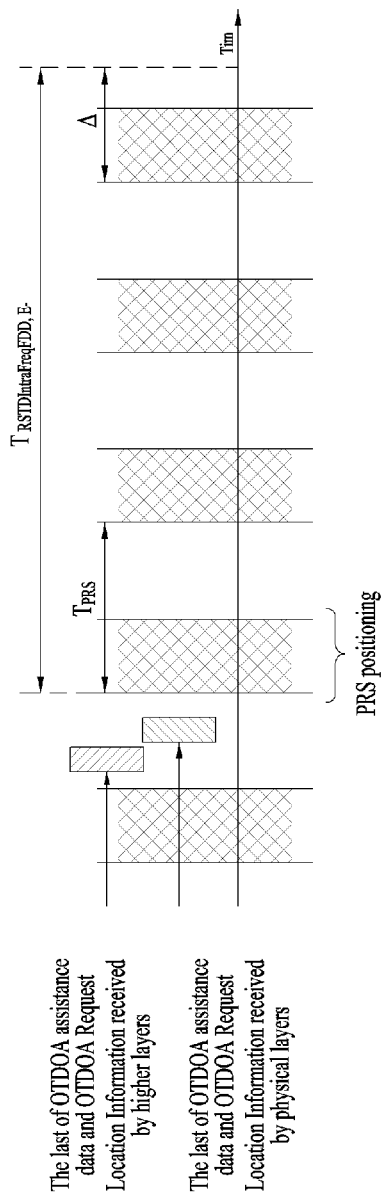
FIG. 5 is a diagram for explaining OTDOA.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

UE Location Information

In general, in order for a network to obtain location information of a UE, various methods are used in a cellular communication system. As a representative method, a UE receives PRS (positioning reference signal) transmission-related configuration information of a base station from a higher layer signal and measures PRSs transmitted by cells adjacent to the UE to calculate location-related information of the UE using a positioning scheme such as OTDOA (observed time difference of arrival) and forwards the calculated information to the network. Besides, an assisted global navigation satellite system (A-GNSS) positioning scheme, enhanced cell-ID (E-CID) techniques, uplink time difference of arrival (UTDOA), and the like exist. The abovementioned positioning schemes can be utilized for various location-based services (e.g., advertising, location tracking, emergency communication means, etc.).

OTDOA (Observed Time Difference of Arrival)

The OTDOA method provides a UE with information on a reference cell and a neighboring cell and makes the UE measure and report a relative time difference between the reference cell and the neighboring cell via a specific signal (e.g., a PRS) to estimate a location of the UE based on the time difference.

In case of FDD, intra-frequency (a PRS is transmitted on a frequency identical to a frequency of a serving cell) OTDOA measurement is explained in the following.

If OTDOA assistance data and a physical cell ID of a neighboring cell are provided, a UE is able to detect an intra-frequency PRS and measure an RSTD during total time for detection and measurement. The total time for detection and measurement can be represented as equation 1 in the following.

$$T_{RSTD\ IntraFreqFDD,E-UTRAN} = T_{PRS} \cdot (M-1) + \Delta \quad \text{[Equation 1]}$$

$T_{RSTD\ IntraFreqFDD,E-UTRAN}$ corresponds to the total time for performing detection and measurement in at least n number of cells. $T_{PRS}$ corresponds to a cell-specific positioning subframe configuration period. M corresponds to the number of PRS positioning occasions and each of the PRS positioning occasions corresponds to contiguous downlink positioning subframes of $N_{PRS}$ ($1 \leq N_{PRS} \leq 6$). The PRS positioning occasions can be defined as Table 1 in the following.

TABLE 1

| Positioning subframe configuration period $T_{PRS}$ | Number of PRS positioning occasions M | |
|---|---|---|
| | f1 | f1 and f2 |
| 160 ms | 16 | 32 |
| >160 ms | 8 | 16 |

When only intra-frequency RSTD measurements are performed over cells belonging to the serving FDD carrier frequency f1.

When intra-frequency RSTD and inter-frequency RSTD measurements are performed over cells belonging to the serving FDD carrier frequency f1 and one inter-frequency carrier frequency f2, respectively.

And, $$\Delta = 160 \cdot \left\lceil \frac{n}{M} \right\rceil$$

ms corresponds to measurement time for single PRS positioning $N_{PRS}$ ($1 \leq N_{PRS} \leq 6$) including sampling time and processing time.

It is necessary for a UE physical layer to have capability capable of reporting an RSTD for a reference cell and all neighboring cells i located at the outside of at least (n−1) number of neighboring cells in the $T_{RSTD\ IntraFreqFDD,E-UTRAN}$. For all frequency bands of the reference cell, (PRS $\hat{E}_s/\text{Iot})_{ref} \geq -6$ dB should be satisfied. For all frequency bands of the neighboring cell i, (PRS $\hat{E}_s/\text{Iot}) \geq -13$ dB should be satisfied. PRS $\hat{E}_s/\text{Iot}$ corresponds to an average reception energy ratio per PRS RE. This ratio is measured for all REs in which a PRS is carried.

Figure 6:
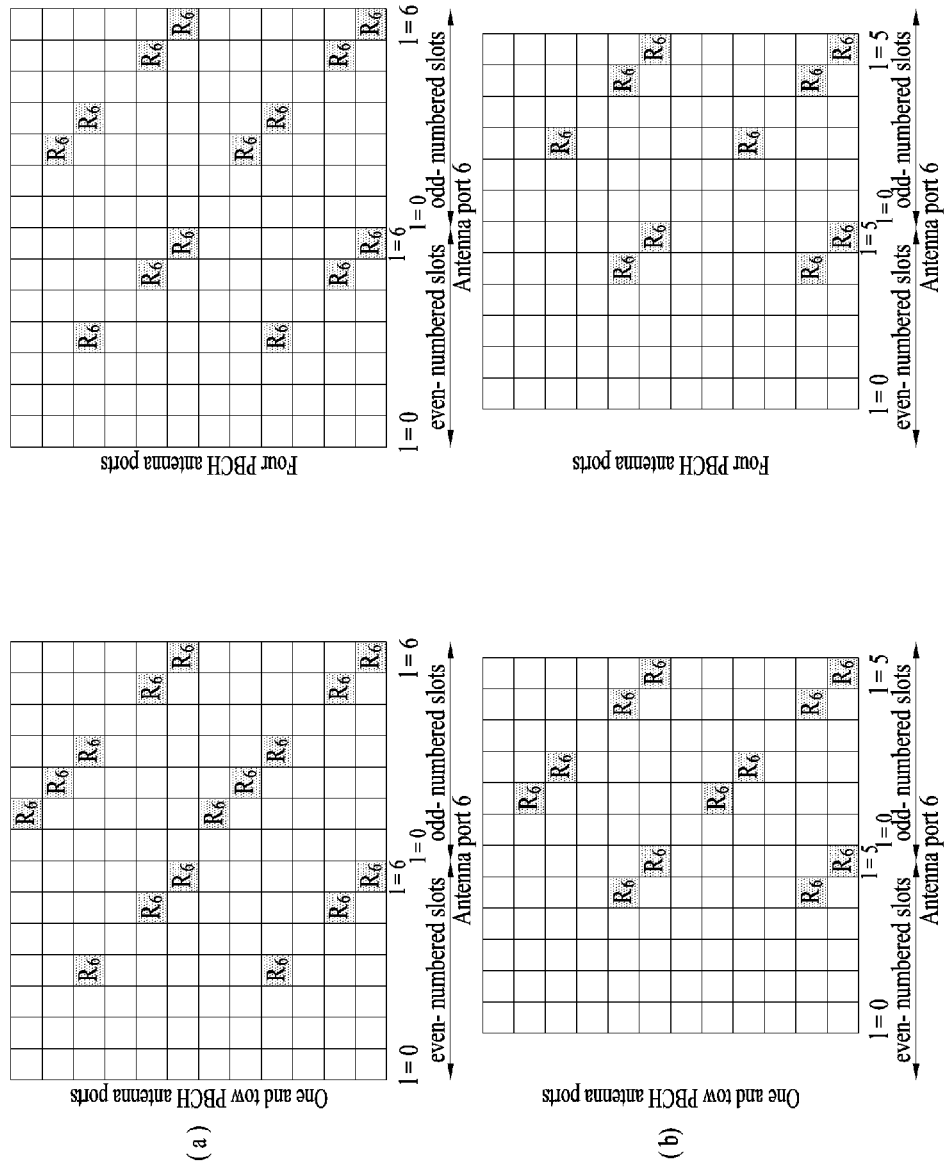
FIGS. 6 to 7 are diagrams for explaining a PRS.

As shown in FIG. 6, $T_{RSTD\ IntraFreqFDD,E-UTRAN}$ starts from a first subframe of a closest PRS positioning occasion after an OTDOA assistance data belonging to OTDOA-RequestLocationInformation and OTDOA-ProvideAssistanceData is received by a physical layer of a UE.

If intra-frequency handover occurs in the middle of measuring an intra-frequency RSTD, a UE should complete an OTDOA measurement session in progress. The UE should satisfy intra-frequency OTDOA measurement and accuracy request as well. In this case, $T_{RSTD\ IntraFreqFDD,E-UTRAN,HO}$ can be represented as equation 2 in the following.

$$T_{RSTD\ IntraFreqFDD,E-UTRAN,HO} = T_{RSTD\ IntraFreqFDD,E-UTRAN} + K \times T_{PRS} + T_{HO}\ \text{ms} \quad \text{[Equation 2]}$$

In this case, K corresponds to the number of intra-frequency handovers occurred during $T_{RSTD\ IntraFreqFDD,E-UTRAN,HO}$ and $T_{HO}$ corresponds to a time period incapable of performing RSTD measurement due to the intra-frequency handover. The time period may have a period up to 45 ms.

Besides, for explanation on TDD intra-frequency, FDD-FDD inter-frequency OTDOA, and TDD-FDD inter-frequency OTDOA, it may refer to 3GPP TS 36.133.

For OTDOA, a base station can transmit information on a reference cell and information on neighboring cells to a UE via OTDOA-ProvideAssistanceData shown in Table 2 in the following.

TABLE 2

```
-- ASN1START
OTDOA-ProvideAssistanceData ::= SEQUENCE {
    otdoa-ReferenceCellInfo   OTDOA-ReferenceCellInfo       OPTIONAL,    -- Need ON
    otdoa-NeighbourCellInfo   OTDOA-NeighbourCellInfoList   OPTIONAL,    -- Need ON
    otdoa-Error               OTDOA-Error                   OPTIONAL,    -- Need ON
    ...
}
-- ASN1STOP
```

In Table 2, the information (otdoa-ReferenceCellInfo) on the reference cell corresponds to an information element (IE) used by a location server to provide reference cell information for the OTDOA assistance data. The information can be represented as Table 3 in the following.

TABLE 3

```
-- ASN1START
OTDOA-ReferenceCellInfo ::= SEQUENCE {
    physCellId         INTEGER (0..503),
    cellGlobalId       ECGI                          OPTIONAL,    -- Need ON
    earfcnRef          ARFCN-ValueEUTRA              OPTIONAL,    -- Cond NotSameAsServ0
    antennaPortConfig  ENUMERATED {ports1-or-2, ports4, ... }
                                                     OPTIONAL,    -- Cond NotSameAsServ1
    cpLength           ENUMERATED { normal, extended, ... },
    prsInfo            PRS-Info                      OPTIONAL,    -- Cond PRS
    ...,
    [[ earfcnRef-v9a0  ARFCN-ValueEUTRA-v9a0  OPTIONAL           -- Cond NotSameAsServ2
    ]]
}
-- ASN1STOP
```

In Table 3, the physCellId corresponds to a physical cell ID of a reference cell and the cellGlobalId corresponds to a unique ID of the reference cell in the overall system. The earfcnRef corresponds to EARFCN of the reference cell. The antennaPortConfig indicates an antenna port to be used for a specific reference signal among antenna ports 1, 2, and 4. The cpLength corresponds to a CP length of a reference cell PRS. The prsInfo corresponds to a PRS configuration of the reference cell.

Table 4 in the following shows a prsInfo information element.

TABLE 4

```
-- ASN1START
PRS-Info ::= SEQUENCE {
    prs-Bandwidth         ENUMERATED { n6, n15, n25, n50,
                                       n75, n100, ... },
    prs-ConfigurationIndex INTEGER (0..4095),
    numDL-Frames          ENUMERATED {sf-1, sf-2, sf-4, sf-6, ...
                                     },
    ...,
    prs-MutingInfo-r9     CHOICE {
        po2-r9                BIT STRING (SIZE(2)),
        po4-r9                BIT STRING (SIZE(4)),
        po8-r9                BIT STRING (SIZE(8)),
        po16-r9               BIT STRING (SIZE(16)),
        ...
    }                                 OPTIONAL    -- Need OP
}
-- ASN1STOP
```

In Table 4, the prs-Bandwidth corresponds to a band used for configuring a PRS and the prs-ConfigurationIndex corresponds to an IPRS corresponding to a PRS configuration index. The numDL-Frames corresponds to $N_{PRS}$ corresponding to the number of contiguous downlink subframes having a PRS. The prs-MutingInfo corresponds to a PRS muting configuration of a cell.

Information on a reference cell is used by a location server to inform a UE of the reference cell and neighboring cells, which are related to a cell defined by the information on the reference cell, are provided by information on the neighboring cells. The information on the neighboring cells provides a list of priority of measurement performed by a UE summarized in a descending order. A first cell of the list has a top measurement priority. The UE performs measurement according to the order provided by the location server.

Table 5 in the following shows a neighbor cell information element (OTDOA-NeighbourCellInfoList).

TABLE 5

```
-- ASN1START
OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement
OTDOA-NeighbourCellInfoElement ::= SEQUENCE {
    physCellId              INTEGER (0..503),
    cellGlobalId            ECGI                    OPTIONAL,      -- Need ON
    earfcn                  ARFCN-ValueEUTRA OPTIONAL,             -- Cond
NotSameAsRef0
    cpLength                ENUMERATED {normal, extended, ...}
                                                    OPTIONAL,      -- Cond
NotSameAsRef1
    prsInfo                 PRS-Info                OPTIONAL,      -- Cond
NotSameAsRef2
    antennaPortConfig       ENUMERATED {ports-1-or-2, ports-4, ...}
                                                    OPTIONAL,      -- Cond
NotsameAsRef3
    slotNumberOffset        INTEGER (0..19)         OPTIONAL,      -- Cond NotSameAsRef4
    prs-SubframeOffset      INTEGER (0..1279)       OPTIONAL,      -- Cond InterFreq
    expectedRSTD            INTEGER (0..16383),
    expectedRSTD-Uncertainty INTEGER (0..1023),
    ...,
    [[ earfcn-v9a0          ARFCN-ValueEUTRA-v9a0 OPTIONAL         -- Cond NotSameAsRef5
    ]]
}
maxFreqLayers   INTEGER ::= 3
-- ASN1STOP
```

In Table 5, the physCellId corresponds to a physical cell ID of a neighbor cell and the cellGlobalId corresponds to a unique ID of the neighbor cell in the overall system. The earfcnRef corresponds to EARFCN of the neighbor cell. The cpLength corresponds to a CP length of the neighbor cell PRS. The prsInfo corresponds to a PRS configuration of the reference cell. The antennaPortConfig indicates an antenna port to be used for a cell-specific reference signal among antenna ports 1, 2, and 4. The slotNumberOffset corresponds to a slot number offset between the neighbor cell and the reference cell. The prs-SubframeOffset corresponds to an offset between a first PRS subframe in a reference carrier frequency layer of the reference cell and a first PRS subframe in a different carrier frequency layer of a different cell. The expectedRSTD indicates an RSTD value expected to be measured between the neighbor cell and the reference cell in a target device. The expectedRSTD-Uncertainty indicates uncertainty of the expectedRSTD value.

The UE receives the information on the reference cell and the information on the neighboring cells and reports an RSTD (reference signal time difference), RSTD quality, reference quality, and the like to a base station. The RSTD corresponds to a relative time difference between a neighboring cell j and a reference cell i. The RSTD is defined by a difference between time (TsubfrmaeRxj) at which the UE receives a start of a subframe from the neighboring cell j and time (TsubframeRxi) at which the UE receives a start of a subframe closest to the subframe from the reference cell i.

Table 6 in the following shows OTDOA-SignalMeasurementInformation reported to the base station by the UE.

TABLE 6

```
-- ASN1START
OTDOA-SignalMeasurementInformation ::= SEQUENCE {
    systemFrameNumber        BIT STRING (SIZE (10)),
    physCellIdRef            INTEGER (0..503),
    cellGlobalIdRef          ECGI                    OPTIONAL,
    earfcnRef                ARFCN-ValueEUTRA        OPTIONAL,   -- Cond NotSameAsRef0
    referenceQuality         OTDOA-MeasQuality       OPTIONAL,
    neighbourMeasurementList NeighbourMeasurementList,
    ...,
    [[ earfcnRef-v9a0        ARFCN-ValueEUTRA-v9a0   OPTIONAL    -- Cond NotSameAsRef1
    ]]
}
NeighbourMeasurementList ::= SEQUENCE (SIZE(1..24)) OF NeighbourMeasurementElement
NeighbourMeasurementElement ::= SEQUENCE {
    physCellIdNeighbor       INTEGER (0..503),
    cellGlobalIdNeighbour ECGI                       OPTIONAL,
    earfcnNeighbour          ARFCN-ValueEUTRA        OPTIONAL,   -- Cond NotSameAsRef2
    rstd                     INTEGER (0..12711),
    rstd-Quality             OTDOA-MeasQuality,
    ...,
    [[ earfcnNeighbour-v9a0  ARFCN-ValueEUTRA-v9a0 OPTIONAL      -- Cond NotSameAsRef3
    ]]
}
-- ASN1STOP
```

In Table 6, the systemFrameNumber corresponds to a system frame number on which the last measurement is performed. The physCellIdRef corresponds to a physical cell ID of a related reference cell that provides RSTDs. The cellGloballdRef corresponds to a unique ID (ECGI) of the related reference cell that provides RSTDs. The earfcnRef corresponds to E-UTRA carrier frequency of the reference cell used for measuring RSTD. The referenceQuality indicates the best estimation quality of arrival time measurement of a signal received from the reference cell used for calculating RSTD value. The neighborMeasurementList corresponds to a list in which measured RSTD values and measurement quality are included. The physCellIdNeighbor corresponds to physical cell IDs of neighboring cells that provide RSTDs. The cellGlobalIdNeighbor corresponds to a unique ID of neighboring cells that provide RSTDs. The earfcnNeighbor corresponds to E-UTRA carrier frequency of neighboring cells used for measuring RSTD. The rstd corresponds to a relative time difference between a reference cell and a neighboring cell. The rstd-Quality corresponds to the best estimation of a device for measured rstd quality.

As mentioned in the foregoing description, a PRS can be used for performing measurement in OTDOA. In the following, a PRS is explained in detail.

PRS (Positioning Reference Signal)

A PRS is a reference signal used for measuring a location of a UE and is transmitted in resource blocks configured to transmit the PRS only in a downlink subframe. A downlink subframe in which the PRS is transmitted corresponds to a positioning subframe. If both a normal subframe and an MBSFN (multicast-broadcast single frequency network) subframe are configured as the positioning subframe in a cell, OFDM symbols belonging to the MBSFN subframe use a CP (cyclic prefix) identical to a CP used in a subframe #0. If the MBSFN subframe is configured as a positioning subframe only in a cell, an extended CP is used in OFDM symbols configured to transmit a PRS in the MBSFN subframe. A start position of OFDM symbols configured to transmit a PRS in a subframe configured to transmit a PRS is identical to a start position of a subframe having a CP length identical to OFDM symbols configured to transmit a PRS. The PRS is transmitted via an antenna port 6. And, the PRS is not mapped to a resource element to which PBCH, PSS (primary synchronization signal), SSS (secondary synchronization signal), and the like are allocated.

A sequence for the PRS is generated by equation 3 in the following.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 3]}$$

$$m = 0, 1, \ldots, 2N_{RB}^{max,DL} - 1$$

In equation 1, $n_s$ corresponds to a slot number and l indicates an OFDM symbol number in a slot. c(i) corresponds to a pseudo-random sequence and is initialized by equation 4 in the following.

$$c_{init} = \quad \text{[Equation 4]}$$

$$2^{10} \cdot (7 \cdot (n_s + 1) + l + 1) \cdot (2 \cdot N_{ID}^{cell} + 1) + 2 \cdot N_{ID}^{cell} + N_{CP},$$

$$N_{CP} = \begin{cases} 1 & \text{for normal } CP \\ 0 & \text{for extended } CP \end{cases}$$

As shown in FIG. 6, the $r_{l,n_s}(m)$ generated by equation 3 is mapped to a complex number modulation symbol $a_{k,l}^{(p)} = r_{l,n_s}(m')$, which is used as a reference signal for an antenna port 6, by equation 5.

for normal $CP_\downarrow$ [Equation 5]

$$k = 6(m + N_{RB}^{DL} - N_{RB}^{PRS}) + (6 - l + v_{shift}) \bmod 6$$

$$l = \begin{cases} 3, 5, 6 & \text{if } n_s\bmod 2 = 0 \\ 1, 2, 3, 5, 6 & \text{if } n_s\bmod 2 = 1 \text{ and} \\ & (1 \text{ or } 2PBCH \text{ antenna ports}) \\ 2, 3, 5, 6 & \text{if } n_s\bmod 2 = 1 \text{ and} \\ & (4PBCH \text{ antenna ports}) \end{cases}$$

$$m = 0, 1, \ldots, 2 \cdot N_{RB}^{PRS} - 1$$
$$m' = m + N_{RB}^{max,DL} - N_{RB}^{PRS}$$

for extended $CP_\downarrow$ $$k = 6(m + N_{RB}^{DL} - N_{RB}^{PRS}) + (5 - l + v_{shift}) \bmod 6$$

$$l = \begin{cases} 4, 5 & \text{if } n_s\bmod 2 = 0 \\ 1, 2, 4, 5 & \text{if } n_s\bmod 2 = 1 \text{ and} \\ & (1 \text{ or } 2PBCH \text{ antenna ports}) \\ 2, 4, 5 & \text{if } n_s\bmod 2 = 1 \text{ and} \\ & (4PBCH \text{ antenna ports}) \end{cases}$$

$$m = 0, 1, \ldots, 2 \cdot N_{RB}^{PRS} - 1$$
$$m' = m + N_{RB}^{max,DL} - N_{RB}^{PRS}$$

A cell-specific subframe configuration period $T_{PRS}$ for transmitting a PRS and a cell-specific subframe offset $\Delta_{PRS}$ can be determined by a PRS configuration index $I_{PRS}$ provided via a higher layer signal.

TABLE 7

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | Reserved | |

A PRS is transmitted in configured downlink subframes and is not transmitted in a special subframe. The PRS can be transmitted in $N_{PRS}$ number of contiguous downlink subframes (PRS positioning occasion) and the $N_{PRS}$ is configured by a higher layer signal. Among the $N_{PRS}$ s number of contiguous downlink subframes, a first subframe satisfies equation 6 in the following.

$$(10 \times n_f + \lfloor n_s/2 \rfloor - \Delta_{PRS}) \bmod T_{PRS} = 0 \quad \text{[Equation 6]}$$

Figure 7:
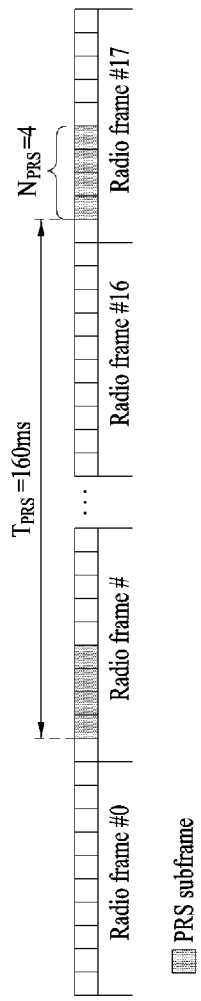

FIG. 7 shows an example of the aforementioned subframe in which the PRS is transmitted. In this case, the PRS positioning occasion $N_{PRS}$ corresponds to 4 and the $T_{PRS}$ corresponds to 160.

As mentioned in the foregoing description, according to the legacy OTDOA scheme, a UE performs measurement on a single reference cell. If estimation of arrival time arrived from the reference cell is inaccurate, an error increases in all RSTD measurement results, thereby deteriorating performance of the OTDOA scheme. Specifically, for example, in case of inter-frequency measurement, since a serving cell is different from a reference cell or a channel state between the reference cell and a UE is very bad in a heterogeneous cell deployment scenario, and the like, an error may increase in a measurement result. In the following, an OTDOA scheme capable of solving the problem is explained according to the embodiment of the present invention based on the aforementioned discussion.

Embodiment 1

Figure 8:
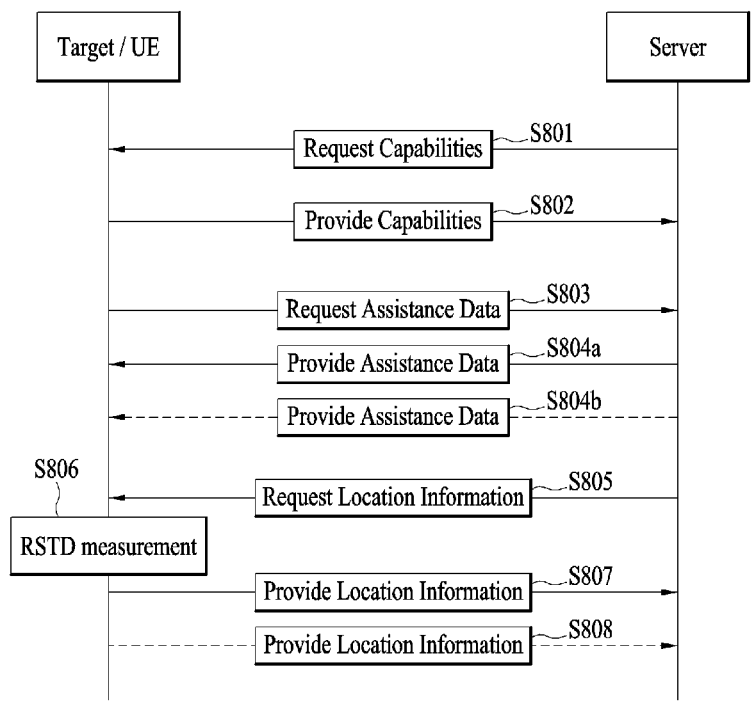
FIG. 8 is a flowchart for explaining an embodiment of the present invention.

Referring to FIG. 8, a UE (a target in FIG. 8) according to the embodiment of the present invention can receive a ProvideAssistanceData message from a server [S804a and b]. The ProvideAssistanceData message can include information on a reference cell and information on neighboring cells. The ProvideAssistanceData message can be received in response to a RequestAssistanceData message transmitted to the server by the UE. Or, unlike FIG. 8, the server may transmit the ProvideAssistanceData message according to the necessity. The UE can receive a RequestLocationInformation message from the server [S805]. Having received the RequestLocationInformation message, the UE can measure an RSTD (Reference Signal Time Difference Measurement) on the basis of the reference cell [S806].

A measurement result is mapped to a value to be reported via a mapping table shown in Table 8 and can be transmitted to the server.

TABLE 8

| Reported Value | Measured Quantity Value | Unit |
|---|---|---|
| RSTD_0000 | −15391 > RSTD | Ts |
| RSTD_0001 | −15391 ≤ RSTD < −15386 | Ts |
| ... | ... | ... |
| RSTD_2258 | −4106 ≤ RSTD < −4101 | Ts |
| RSTD_2259 | −4101 ≤ RSTD < −4096 | Ts |
| RSTD_2260 | −4096 ≤ RSTD < −4095 | Ts |
| RSTD_2261 | −4095 ≤ RSTD < −4094 | Ts |
| ... | ... | ... |
| RSTD_6353 | −3 ≤ RSTD < −2 | Ts |
| RSTD_6354 | −2 ≤ RSTD < −1 | Ts |
| RSTD_6355 | −1 ≤ RSTD ≤ 0 | Ts |
| RSTD_6356 | 0 < RSTD ≤ 1 | Ts |
| RSTD_6357 | 1 < RSTD ≤ 2 | Ts |
| RSTD_6358 | 2 < RSTD ≤ 3 | Ts |
| ... | ... | ... |
| RSTD_10450 | 4094 < RSTD ≤ 4095 | Ts |
| RSTD_10451 | 4095 < RSTD ≤ 4096 | Ts |
| RSTD_10452 | 4096 < RSTD ≤ 4101 | Ts |
| RSTD_10453 | 4101 < RSTD ≤ 4106 | Ts |
| ... | ... | ... |
| RSTD_12709 | 15381 < RSTD ≤ 15386 | Ts |
| RSTD_12710 | 15386 < RSTD ≤ 15391 | Ts |
| RSTD_12711 | 15391 < RSTD | Ts |

The UE can transmit an RSTD measurement result to the server. In this case, the RSTD measurement result can be transmitted in a manner of being included in a ProvideLocationInformation message [S807].

In the foregoing description, the UE can select the reference cell from among a reference cell indicated by information included in the ProvideAssistanceData or a plurality of cells indicated by the information included in the ProvideAssistanceData. In this case, the UE can select a cell closest to the UE as a reference cell from among a plurality of reference cells. Or, the UE can selects a cell of a strongest signal as a reference signal from among a plurality of the reference cells.

The ProvideLocationInformation message can mandatorily include quality information of a reference cell. In particular, OTDOA-SignalMeasurementInformation shown in Table 9 can be used.

TABLE 9

```
-- ASN1START
OTDOA-SignalMeasurementInformation ::= SEQUENCE {
    systemFrameNumber      BIT STRING (SIZE (10)),
    physCellIdRef          INTEGER (0..503),
    cellGlobalIdRef        ECGI                        OPTIONAL,
    earfcnRef              ARFCN-ValueEUTRA            OPTIONAL,      -- Cond NotSameAsRef0
    referenceQuality       OTDOA-MeasQuality       ,
    neighbourMeasurementList   NeighbourMeasurementList,
    ...,
    [[ earfcnRef-v9a0      ARFCN-ValueEUTRA-v9a0       OPTIONAL       -- Cond NotSameAsRef1
    ]]
}
NeighbourMeasurementList ::= SEQUENCE (SIZE(1..24)) OF NeighbourMeasurementElement
NeighbourMeasurementElement ::= SEQUENCE {
    physCellIdNeighbor     INTEGER (0..503),
    cellGlobalIdNeighbour ECGI                         OPTIONAL,
    earfcnNeighbour        ARFCN-ValueEUTRA            OPTIONAL,      -- Cond NotSameAsRef2
    rstd                   INTEGER (0..12711),
    rstd-Quality           OTDOA-MeasQuality,
    ...,
    [[ earfcnNeighbour-v9a0  ARFCN-ValueEUTRA-v9a0 OPTIONAL           -- Cond NotSameAsRef3
    ]]
}
-- ASN1STOP
```

In particular, it may be able to configure the ProvideLocationInformation message to be transmitted in a solid line arrow shown in FIG. 8. According to the legacy scheme, all UEs report quality of a reference cell to a server through two feedback processes. In this case, if a channel state is not good or mobility of a UE is high, quality information of the reference cell is not properly reported to the server due to the delay of the report or delay may occur. On the contrary, according to the method proposed by the present invention, since quality of a reference cell is reported at a time at the first report, delay does not occur and a network (e.g., LPP server) can select an optimized reference cell at all time.

The quality information of the reference cell can include OTDOA-MeasQuality. The OTDOA-MeasQuality can include the best estimation value of the UE for the uncertainty of OTDOA measurement.

Embodiment 2

If a UE has a reference cell capable of being changed, a network can configure the UE only to report measurement quality of the reference cell via physical layer signaling or higher layer signaling. The network can indicate a specific UE to report measurement quality of a reference cell via a physical layer or higher layer signal. The indicated UE can report measurement quality of a reference cell at the first report (a solid line part in FIG. 8) or can report the measurement quality of the reference cell at an additional report.

By doing so, it may be able to improve inefficiency in reporting measurement quality. If the network optionally makes a feedback on the quality of the reference cell, all UEs participating in OTDOA should report the quality of the reference cell to the server via an additional feedback process. If the feedback on the quality of the reference cell is configured as mandatory, since it is necessary for all UEs to report the measurement quality of the reference cell at the first report, it may cause signaling inefficiency. The above-mentioned configuration improves the signaling inefficiency.

The embodiment 2 is different from the embodiment 1 in that a network can indicate only a specific UE to report measurement quality of a reference cell among UEs. Since the network has performed signaling, the network determines whether or not the UE properly reports the measurement quality of the reference cell to identify an error case.

Embodiment 3

Multiple reference cell information is configured and it may be then able to configure a UE to report an RSTD measurement value measured for multiple references or a selected reference cell (e.g., selects a cell of the best SNR as a reference cell).

The UE can report RSTD measured for all reference cells configured by the network and related information to the network. To this end, the UE can signal information on the capability of the UE indicating whether or not the UE is able to calculate/report RSTD for a plurality of reference cells to a server.

The network can determine the number of reference cells to be configured according to the capability of the UE.

Or, the UE may select the best reference cell from among a plurality of the reference cells and can report RSTD for the selected reference cell and related information to the server.

According to the RSTD measurement scheme of current OTDOA, it may be able to measure RSTD between a serving cell and neighboring cells by measuring a PRS transmitted in maximum 6 subframes in a PRS occasion transmitted with a minimum period of 160 ms. In particular, it may be able to measure RSTD of a partial cell only in a single PRS occasion. In this case, RSTD of a specific cell can be measured using TOA measured from a different PRS occasion. In this case, due to a time difference, it may measure an inaccurate RSTD. In particular, when a UE has high mobility, if feedback is performed on RSTD of a specific reference cell only, it may have a considerable amount of accumulated TOA errors. According to the scheme proposed in the present invention, since feedback is performed by calculating RSTD values for a plurality of reference cells, it may measure and feedback RSTD by changing a reference cell according to a specific PRS occasion or it may measure RSTD by appropriately selecting a reference cell including a less PRS occasion time difference. And, since a network is able to calculate location estimation by utilizing RSTD values for a plurality of reference cells, it may be able to obtain diversity of RSTD measurement.

Embodiment 4

Among UEs, if a UE is able to know a position of the UE via a GPS, cellular-based positioning, or Bluetooth (beacon, etc.)-based positioning, the UE may become an anchor UE. The anchor UE can transmit a predetermined reference signal (DMRS, synchronization signal, SRS, PRACH preamble, etc.).

A target UE (a UE intending to search for a location) receives signals of a plurality of UEs, a signal of an eNB, and the like, measures a timing difference of the received signals, and reports the measured timing difference to a network. When a reference anchor UE is selected from among a plurality of anchor UEs, an eNB or a specific UE (a target UE, an anchor UE, or a different specific UE) can indicate a specific anchor UE. The eNB signals a list of a plurality of reference anchor UEs and a UE measures RSTD of a plurality of the reference anchor UEs and reports the RSTD to the eNB. Or, the eNB signals a list of a plurality of reference anchor UEs and a UE selects a reference anchor UE of the best channel state. The UE measures RSTD of the selected reference anchor UE and may be able to report the RSTD to the eNB.

Or, the UE reports the RSTD measurement result, the reference cell, and all or a part of reception signal quality, RSTD measurement quality, RSRP, and RSRQ to the network via physical/higher layer signaling to make the network change the reference cell.

In the following, when a location of a UE is measured by utilizing RSSI measurement of WiFi or Bluetooth beacon, a method of minimizing a location measurement error due to an RF unique feature of the UE is explained. In particular, it may consider a scheme of performing feedback on a (beacon) RSSI of a WiFi AP and a MAC address of the AP (a location of the AP, an address capable of indicating the AP, and an ID or a bit sequence) to an eNB or a specific AP. In this case, the RSSI of WiFi is fed back to the eNB rather than the WiFi AP. This is because, although a specific WiFi AP is able to measure a signal, the specific WiFi AP is unable to perform access for transmitting and receiving data. In this case, if measurement of a surrounding WiFi signal (e.g., RSSI, MAC address) is fed back to the eNB, it can be efficient. In the following, when an RSSI measurement result of a WiFi signal is reported, a method of reducing an error due to an RF feature of a UE is explained.

It may be able to report average RSSI in a prescribed time window together with RSSI. In this case, a window size can be determined in advance or can be signaled to a UE measuring WiFi RSSI via physical layer signaling or higher layer signaling by a network. When RSSI of a WiFi AP is measured, the RSSI can be differently measured according to an RF feature of the UE. In this case, a relative difference compared to an average of the RSSI according to a location can be measured irrespective of the RF feature of the UE. In order to get rid of the uncertainty of the RSSI measurement due to the RF feature of the UE, it may be able to report the RSSI average together.

Or, it may be able to report a normalized RSSI. The normalized RSSI is fed back to reduce the amount of feedback compared to the scheme of performing feedback on both the RSSI and the average of the RSSI. In particular, the average of the RSSI is measured in a predetermined window or a window signaled by the network and an RSSI/RSSI average value normalized (i.e., measured) at a specific location is fed back.

Or, it may be able to report an RSSI difference between APs. To this end, the network can signal a MAC address of a reference AP or information of the reference AP to a UE. Or, the UE may set the MAC address of the reference AP and may be then able to feedback the MAC address to the eNB. For example, if 3 APs are examined, the UE determines an AP 1 as a reference AP and feeds back values of RSSI_2−RSSI_1 and RSSI_3−RSSI_1 to the eNB.

When a report is performed on a single AP, it may report RSSI, normalized RSSI, or RSSI+average RSSI (in a specific time window). When a report is performed on multiple APs, it may report an RSSI difference among a plurality of the APs. In case of a single AP, the normalized RSSI is reported to reduce a distance conversion error due to a received RF feature. When a plurality of APs are examined, an RSSI difference between APs is fed back to reduce a distance conversion error due to a received RF feature.

In the foregoing description, a method of reducing an error due to a received RF feature has been explained. In this case, a distance conversion error may occur due to an RF feature of a transmission AP. For example, when an AP manufactured by a manufacturer A transmits a signal of 5 dBm, 4 dBm is examined at a distance of 1 m. On the contrary, when an AP manufactured by a manufacturer B transmits a signal of 5 dBm, 3 dBm can be examined at a distance of 1 m. This is because reception power is differently examined due to transmission RF feature. In order to solve the problem, a transmission AP can inform a reception UE of actual transmit power examined at an antenna port of the transmission AP or an actual power value examined at a distance away from the transmission AP as much as X meter (in this case, the X corresponds to a predetermined distance (e.g., X=1)) via physical or higher layer signaling.

Configurations of Devices for Embodiments of the Present Invention

Figure 9:
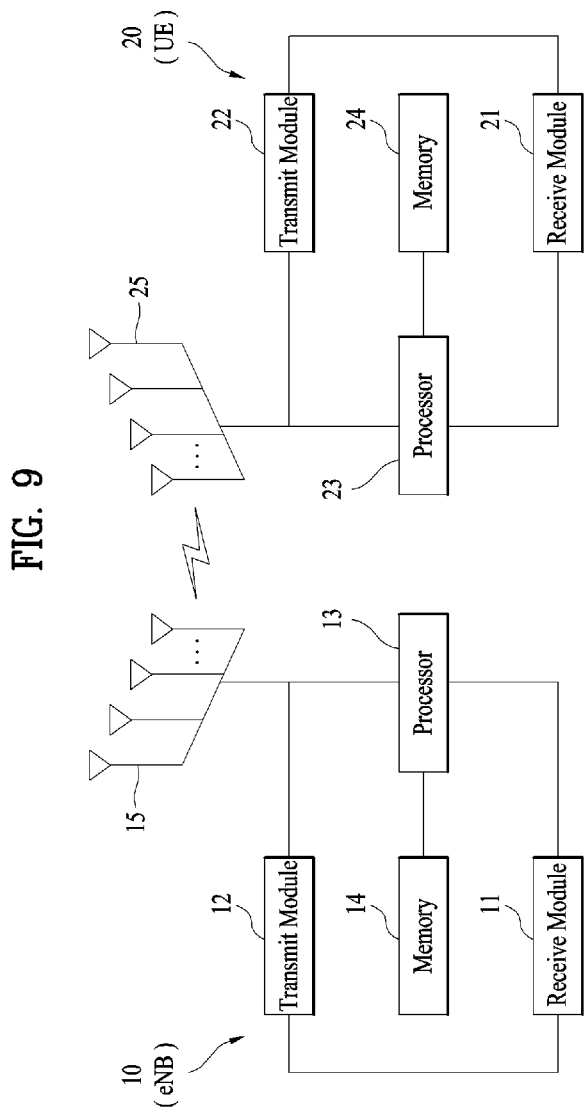
FIG. 9 is a diagram for configurations of a transmitter and a receiver.

FIG. 9 is a diagram for configurations of a transmitter and a receiver.

Referring to FIG. 9, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 9, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 9 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of performing an OTDOA (observed time difference of arrival)-related operation, which is performed by a User Equipment (UE) in a wireless communication system, the method comprising:
  transmitting, to a server, capability information on whether a Reference Signal Time Difference (RSTD) for multiple reference cells can be measured and reported;
  receiving a ProvideAssistanceData message including information on a plurality of reference cells determined based on the capability information and information on neighboring cells from the server,
  wherein the number of the plurality of reference cells is determined according to the capability information;
  receiving a RequestLocationInformation message from the server;
  measuring the RSTD for each of the plurality of reference cells using the neighboring cells after the RequestLocationInformation message is received; and
  transmitting measurement results of the RSTD related to each of the plurality of reference cells to the server.

2. The method of claim 1, wherein the measurement result of the RSTD is contained in a ProvideLocationInformation message.

3. The method of claim 1, wherein a ProvideLocationInformation message mandatorily comprises quality information of the plurality of reference cells.

4. The method of claim 3, wherein the quality information of the plurality of reference cells comprises OTDOA-MeasQuality.

5. The method of claim 4, wherein the OTDOA-MeasQuality comprises the best estimation value of the UE for the uncertainty of OTDOA measurement.

6. A User Equipment (UE) performing an OTDOA (observed time difference of arrival)-related operation in a wireless communication system, the UE comprising:
  a transmitter;
  a receiver; and
  a processor configured to:
  transmit, to a server, capability information on whether Reference Signal Time Difference (RSTD) for multiple reference cells can be measured and reported,
  receive a ProvideAssistanceData message including information on a plurality of reference cells determined based on the capability information and information on neighboring cells from the server,
  wherein the number of the plurality of reference cells is determined according to the capability information,
  receive a RequestLocationInformation message from the server,
  measure the RSTD for each of the plurality of reference cells using neighboring cells after the RequestLocationInformation message is received, and
  transmit measurement results of the RSTD related to each of the plurality of reference cells to the server.

7. The UE of claim 6, wherein the measurement result of the RSTD is contained in a ProvideLocationInformation message.

8. The UE of claim 7, wherein a ProvideLocationInformation message mandatorily comprises quality information of the plurality of reference cells.

9. The UE of claim 8, wherein the quality information of the plurality of reference cells comprises OTDOA-MeasQuality.

10. The UE of claim 9, wherein the OTDOA-MeasQuality comprises the best estimation value of the processor for the uncertainty of OTDOA measurement.

* * * * *